United States Patent
Jack et al.

(12) 
(10) Patent No.: US 6,329,655 B1
(45) Date of Patent: Dec. 11, 2001

(54) ARCHITECTURE AND METHOD OF COUPLING ELECTROMAGNETIC ENERGY TO THERMAL DETECTORS

(75) Inventors: Michael D. Jack; Michael Ray, both of Goleta; John Varesi, Santa Barbara; Jan Grinberg, Los Angeles; Harold Fetterman, Pacific Palisades; Franklin A. Dolezal, Reseda, all of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/414,989

(22) Filed: Oct. 7, 1999

Related U.S. Application Data
(60) Provisional application No. 60/103,421, filed on Oct. 7, 1998.

(51) Int. Cl.[7] .................... G01J 5/00; G01J 5/20
(52) U.S. Cl. .................... 250/338.1; 250/338.4; 338/14; 338/18
(58) Field of Search .................... 250/338.1, 338.4, 250/336.1, 370.01, 264, 266, 267, 339.1, 339.2, 339.3, 339.4; 338/14, 18, 22 R, 228 D, 23, 24; 343/700, 720, 721

(56) References Cited

U.S. PATENT DOCUMENTS
4,654,622 * 3/1987 Foss et al. .................... 338/14

* cited by examiner

Primary Examiner—Hung Xuan Dang
(74) Attorney, Agent, or Firm—William C. Schubert; Glenn H. Lenzen, Jr.

(57) ABSTRACT

A radiation sensor. The inventive sensor has a two-level detector structure formed on a substrate in which a thermal detector element is suspended over the substrate as a microbridge structure. A receiver of electromagnetic radiation is provided on the same side of the substrate in a manner that efficiently couples the radiation field to the thermal detector element. The thermal detector element has a sandwich structure including a heater metal layer, a dielectric layer, and a thin film thermo-resistive material. The thermal detector element is suspended out of physical contact with the receiver. In one embodiment, the receiver is an antenna having a crossed bowtie configuration that efficiently couples the radiation field to the detector element. The inventive radiation sensors are especially useful for mm-wave and microwave sensing applications. The sensor can be used individually or in linear or two-dimensional arrays thereof. The invention also is directed to a method of fabricating such a radiation sensor.

22 Claims, 3 Drawing Sheets

ARCHITECTURE AND METHOD OF COUPLING ELECTROMAGNETIC ENERGY TO THERMAL DETECTORS

CROSS-REFERENCE TO RELATED APPLICATIONS

This application claims the benefit of U.S. Provisional Application No. 60/103,421 filed Oct. 7, 1998.

BACKGROUND OF THE INVENTION

1. Field of the Invention

The present invention generally relates to the field of radiation sensors. More particularly, the present invention relates to high sensitivity electromagnetic radiation sensors useful as passive imagers in the millimeter wave or microwave regimes.

2. Description of the Related Art

Radiation sensors are generally known which convert electromagnetic radiation energy absorbed by a radiation sensitive material into an electrical signal. Conventional thermal detection has included temperature sensitive capacitors or temperature sensitive resistors (also called bolometers) arranged in an array where a detector signal is coupled into a signal multiplexer. The amount of radiation received by a thermal detector is relatively small, which is critical, particularly when the detector is an uncooled type, and measures have had to be taken to decrease the heat capacity of the detector and prevent dissipation of the received radiation. To accomplish this, the prior art has used semiconductor fine patterning or micro-machining techniques to fabricate a radiation sensor having a thermally-isolated, thermally sensitive resistive or capacitive material portion suspended as a microbridge structure over a substrate which keeps the thermally sensitive material out of direct contact with the substrate. (See, for example, U.S. Pat. Nos. 4,574,263 and 5,302,933.)

Thermally isolated thermal detectors have been fabricated as an array of microbridges with a thermoresistive (thermo-capacitive) element in each microbridge. In the following, the reference to the "thermoresistive" phenomena or devices will also be understood to include thermo-capacitive phenomena or devices. The resistive microbolometers optimally have a high thermal coefficient of resistance and low thermal conductance between the absorbing area and a readout circuit that multiplexes the radiation signal. As each detector pixel absorbs the radiation being detected or monitored, the microbridge temperature changes accordingly and the elemental resistance is altered. For these arrangements, standard photolithographic techniques with selective etching have been used to pattern the thin film to form detectors for individual pixels of the array of detectors.

However, a problem associated with conventional microbolometer architectures involving thermally isolated detectors is the difficulty in achieving and maintaining an efficient coupling of some bands of electromagnetic radiation, such as millimeterwave (mm-wave) and microwave radiation, to a thermal detector and, in particular, to an array of thermal detectors, while maintaining the thermal isolation of the detector(s) needed for high sensitivity. U.S. Pat. No. 5,450,053, the teachings of which are incorporated herein by reference, describes incorporating antennas in microbolometer detector architectures used for IR/mm-wave detection to provide a mm-wave energy coupling apparatus. In one embodiment, U.S. Pat. No. 5,450,053 describes use of "bow-tie" microantenna designs formed on the backside of silicon substrate while IR sensitive microdetector arrays are formed on the opposite frontside of the substrate, such that incident radiation is collected by the antennas after passing through the substrate.

While U.S. Pat. No. 5,450,053 addresses the issue, a need remains in the art for a radiation sensor with increased sensitivity relative to prior designs.

SUMMARY OF THE INVENTION

The need in the art is addressed by the radiation sensor of the present invention. The inventive sensor comprises a thermally sensitive detector element that is efficiently coupled to an electromagnetic radiation field, via a receiver (e.g., an antenna), in a manner that endows the sensor with increased sensitivity.

The radiation sensor of the invention has a two-level detector structure formed on a substrate. A thermal detector element is suspended over the substrate as a microbridge structure. The detector has a sandwich structure of a heater metal film, a dielectric layer, and a thin film thermoresistive material (i.e., a thermally responsive resistive material). The heater metal film is maintained out of physical contact with a receiver of electromagnetic radiation. The receiver is provided on the same side of the substrate in a manner which efficiently couples the radiation field to the thermal detector element.

In one embodiment, the inventive radiation sensor has a receiver of electromagnetic radiation that is an antenna having a unique and improved shape for coupling a radiation field to the thermal detector element. Namely, the improved antenna shape of the antenna is defined by two constituent micro-antennas which are orthogonally-oriented to one another in a manner enabling interception of electromagnetic radiation of both polarities. Preferably, the antenna shape is represented by a "crossed bowtie" configuration in which each constituent bowtie micro-antenna of the antenna has first and second conductive arms terminating at inner (output) ends separated from each other by a lateral gap. Thus, each constituent bowtie micro-antenna of the antenna is missing a "knot", so to speak. This is done so that the radiation sensor can be capacitively coupled to the radiation field by arranging the inner ends of the pair of constituent microantennas comprising each antenna as underlapping part of a heater metal layer provided on the underside (or, alternatively, above or on both sides) of the thermal detector element. The resistance of the heater metal layer and the capacitance from the antenna underlap are selected so that the total impedance of the series capacitance-resistance-capacitance is matched as much as possible to the antenna impedance for efficient coupling, and the capacitive impedance is preferably smaller than the dissipative metal impedance on the bridge. Other symmetrical crisscrossed antenna shapes besides the crossed bowties, such as a logarithmic-curve side profile and so forth, are also contemplated for practice of this invention that provides the coupling function. Preferably, the antenna is formed as planar, thin conductive film upon a dielectric layer that rests on a semiconductor body.

The performance of the inventive sensor as passive mm-wave sensor is significantly enhanced by such a crossed bowtie antenna shape and the like specifically in case of receiving natural passive radiation which is randomly polarized, i.e., has equal components in both polarization directions. The sensor devices of this invention are especially well-suited for implementation in the mm-wave (e.g., 3 mm at 94 GHz) regime. Also, the inventive sensors have versatile implementation capabilities as they can be implemented in either a capacitively coupled mode, a resistively coupled mode, or an inductively coupled mode.

As will be apparent from the descriptions herein, this invention provides an enhanced sensor architecture and geometry compatible with semiconductor VLSI processing which enables high efficiency non-contact coupling between a receiver of electromagnetic radiation, for example, a thin film antenna, and a thermal detector, for example, a bolometer, pyroelectric or thermopile. Simultaneously, this invention provides for efficient dissipation of the coupled energy within the thermally isolated bridge. The inventive sensor can be used as an individual thermal pixel or in linear or two-dimensional arrays thereof. The invention also is directed to a method of fabricating such a radiation sensor.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

General speaking, the present invention provides efficient coupling of electromagnetic radiation (e.g., millimeter radiation) to a thermal detector, and, in particular, to an array of thermal detectors while maintaining the thermal isolation of the thermal detector as needed for high sensitivity. The embodiments of this invention use a thermally isolated microbridge structure containing a thin film thermally resistive film as a thermal detector element that together with the capacitive or inductive impedance of the coupling is matched to the effective antenna impedance. A methodology for optimization of the coupling is also provided. These and other objectives are accomplished by use of a thin film antenna array matched to a specific electromagnetic band, e.g., 90 GHz–190 GHz, deposited on a surface of a substrate in the manners such as described herein. Each antenna element of the array is overlapped by a thermal detector element formed on the same side of the substrate in which the thermal detector element is suspended over the antenna via a microbridge construction. An intervening air gap or space is provided between the thermal detector element and the antenna (and which might be a vacuum gap in operation) to provide thermal isolation therebetween. The thermal detector element is a sandwich structure formed as a minimum of a composite of a heater metal layer (or a semiconductor layer of appropriate resistivity), and dielectric layers sandwiching a bolometric element (viz., a thermally responsive resistive film). The electromagnetic energy intercepted by each antenna may be capacitively, resistively or inductively coupled to the thermal detector element, which can be part of a bolometer array. As discussed more fully below, in the case of capacitive coupling, the energy captured by the antenna is capacitively coupled from the portion of the antenna underlapping the related microbridge thermal detector element through a precisely controlled gap to the dissipative heater metal layer constituent of the detector element. The resistance of the heater metal layer and the capacitance from the antenna underlap are selected so that (1) the total impedance of the series capacitance-resistance-capacitance is substantially matched to the antenna impedance for efficient coupling and (2) the capacitive impedance is preferably smaller than the dissipative metal impedance in the bolometer.

Figure 1:
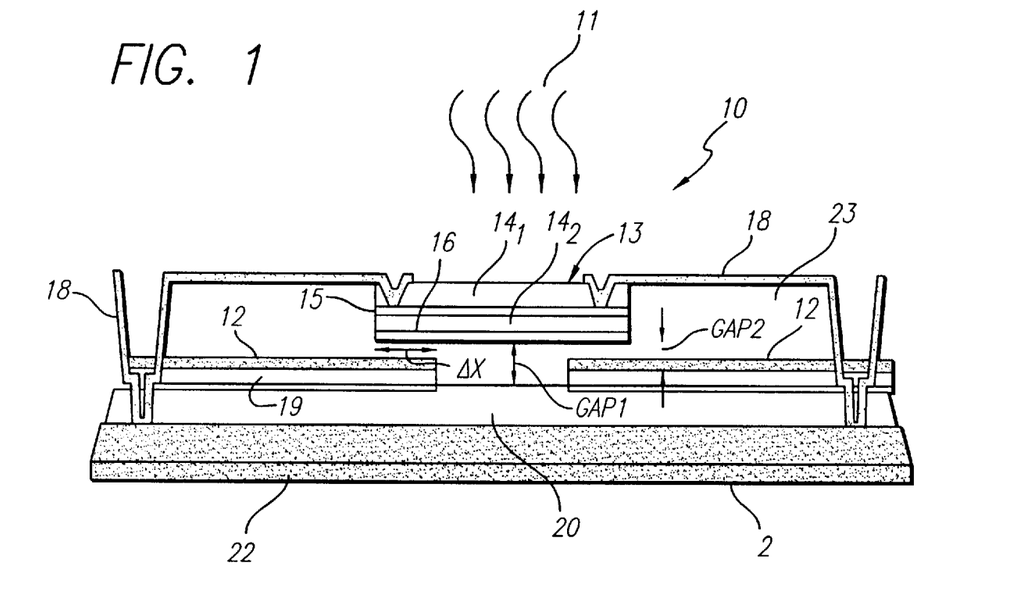
FIG. 1 is a cross-sectional side view of a single thermal pixel of a capacitively coupled mm-wave sensor according to one embodiment of this invention.

A Capacitive Coupling Implementation:

Referring now to the figures, and more particularly to FIG. 1, a cross-section of a single capacitively coupled radiation sensor 10 according to one embodiment of the invention is illustrated. Although a single sensor or thermal pixel assembly 10 is described for sake of simplifying the discussion here, it will be understood that most practical implementations of the invention are directed to the use of such sensors 10 in the form of a linear or two-dimensional array of adjoining sensors, depending, for example, on whether a scanning or a staring type sensor is desired. For at least a plurality of if not substantially all the thermal detectors where an array of sensors is involved, the thermal detectors each has its own antenna dedicated to support it. Electromagnetic radiation 11, e.g., mm-wave radiation, is efficiently intercepted by the highly conductive antenna 12. The antenna 12 is a generally planar thin film of conductive material (e.g., a conductive metal such as aluminum or copper) formed on a thin dielectric film 19 (e.g., $SiO_2$, $Si_3N_4$), which, in turn, overlies an overglass layer 20 (e.g., a field oxide such as $SiO_2$) and a substrate 21. The substrate has generally flat, opposing major surfaces. The substrate 21 can be an electronic readout integrated circuit chip using a semiconductor (e.g., silicon) wafer, or a silicon-on-insulator structure (i.e., SOI), or a silicon-on-sapphire (SOS) structure.

The thermal detector element 13 is preferably a planar sandwich structure. The thin film thermally responsive resistive layer 15 (e.g., $VO_x$ where $x \leq 2$, $V_2O_y$, where y is an integer in the range 2–5, $TiO_x$, and so forth) is sandwiched between dielectric thin films $14_1$ and $14_2$ (e.g., $Si_3N_4$, $SiO_2$, $SiO_xN_y$). A heater metal (or semiconductor of appropriate resitivity) film 16, which preferably is a NiCr (Nichrome) layer, forms the bottom layer (or the top layer, or both) of detector element 13. The shape of each discrete detector element 13 must accommodate the microbridge construction. Also, the mass of the thin film resistive element 15 should be kept relatively low in order to provide fast response time, so this consideration supports a thin film construction. Leadout contact legs 18 effectively suspend the detector element 13 in the form of a microbridge structure above and spaced from the surface of the antenna 12. In this way, the detector element 13 is thermally isolated from the support structure other than the interconnecting readout contacts 18 in the sense that there is no direct contact made with the substrate 21 or its surface layers (20, 19, 12). The contact legs 18 connect the thin film thermoresistive layer 15 to a low-noise electronic readout circuit (not shown) located on or off the substrate, which can be of a conventional type used for this purpose, monitoring the resistance of the thin film thermoresistive layer 15 of detector element 13 to provide electrical output signals to signal processing circuitry (not shown), which also can be of a conventional type used for this purpose.

In principle, there are three ways to connect the antenna to the heater element, which is also antenna matching load. The three ways are as follows: resistive (sometimes referred to also as ohmic), capacitive or inductive (as in the case of transfer motor).

The resistive coupling will cause either poor coupling efficiency or large thermal losses from the bridge to the underlying substrate or both. The antenna matching load needs to be around 100 ohms ($\Omega$), to match the antenna to the free space. Therefore, the heating element, being at the same time also antenna matching load, needs to be of the order of magnitude of 100 ohms. To achieve an efficient antenna to heating element coupling the connection has to be much lower than 100 ohms. On the other hand, the thermal conductivity is proportional to the electrical conductivity. To achieve good thermal isolation, the electrical resistivity has to be of the order of magnitude of a few killiohms (K$\Omega$). Therefore, a resistivity of less than 100 ohms can not be tolerated and still preserve the desired thermal isolation. In other words, if the interconnect is made of high resistivity (>1 K$\Omega$), then a very low coupling efficiency results. If the interconnect is made low resistivity (<100 ohms), the thermal losses are very high. If the connection is made of an order of magnitude of 1 K$\Omega$, both suffer badly. The inductive coupling efficiency depends on the number of loops. Using the thin film technology, only a few loops are feasible, and this results with coupling efficiency of about 1% only. On the other hand, the capacitive coupling provides both efficiency and isolation.

Figure 2A:
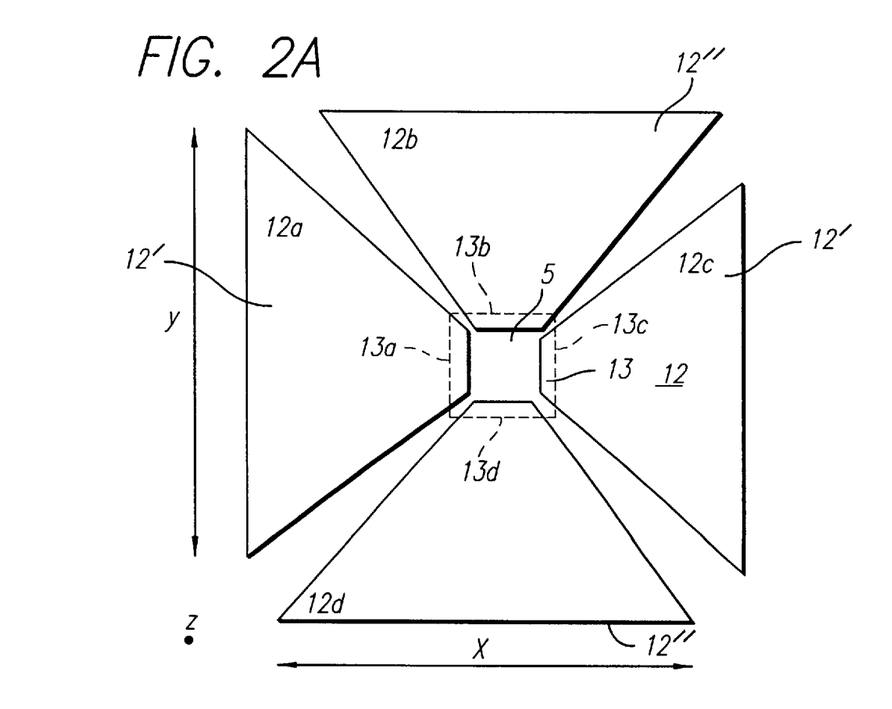
FIG. 2A is a top view of the antenna coupled thermal pixel of FIG. 1 utilizing two orthogonally-oriented constituent microantennas as the receiver of incident electromagnetic radiation.

Referring to FIG. 2A, the overall configuration of antenna 12 is a modified crossed bowtie shape in which the location of the superposed mm-wave detector element 13, indicated by the dotted lines, and bounded by its peripheral side edges 13a, 13b, 13c, and 13d, is superposed for reference sake. The crossed bowtie shape of the antenna 12 is modified in the sense that the two constituent bowtie microantennas 12' and 12" are oriented orthogonally with each other with the proviso that the two bowties do not physically meet at their geometric centers. Moreover, the micro-antennas 12' and 12" do not physically contact each other at any location.

Figure 2B:
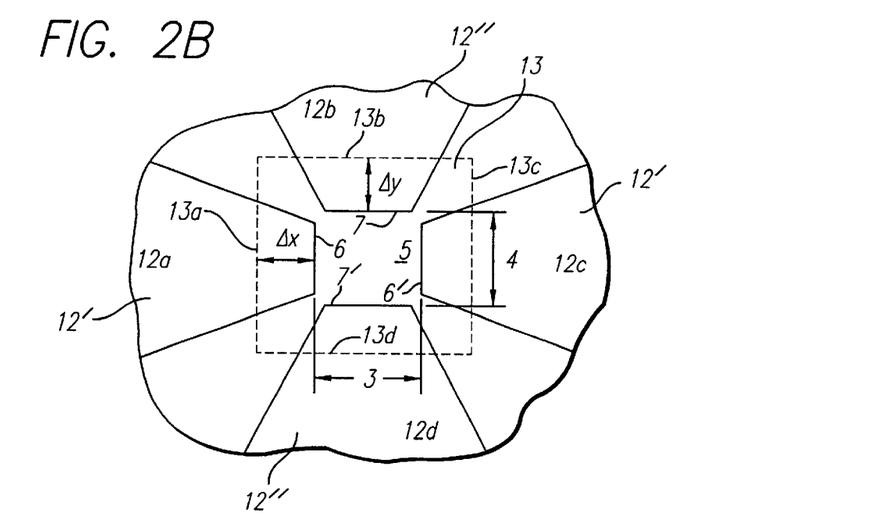
FIG. 2B is an enlarged view of the central area of the antenna illustrated in FIG. 2A.

As can be better seen in FIG. 2B, a lateral (horizontal) gap distance 3 is provided between the inner ends 6 and 6' of conductive arms 12a and 12c, respectively, of bowtie 12'. Similarly, a lateral (horizontal) gap distance 4 is provided between the inner ends 7 and 7' of conductive arms 12b and 12d, respectively, of bowtie 12". None of the conductive arms 12a, 12b, 12c and 12d physically contact each other as that would lead to shorting of the gap. Conductive arms 12a and 12c of first bowtie microantenna 12' each partly underlap the overlying side edges 13a and 13c, respectively, of overlying mm-wave detector element 13. This underlap is a distance $\Delta x$ at each of the inner ends 6 and 6' of the arms 12a and 12c of that bowtie 12'. The lateral separation gap distance 3 in the x-direction is also provided between the two arms 12a and 12c beneath the heater metal layer 16 of the sensor 13. The conductive arms 12b and 12d of the second bowtie microantenna 12" constituent of antenna 12, and oriented orthogonally to the first bowtie 12', underlap side edges 13b and 13d, respectively, of detector element 13. The underlaps of detector element 13 by conductive arms 12b and 12d of microantenna 12" are each a distance $\Delta y$ at the inner ends 7 and 7', respectively, of each arm of that second bowtie. The lateral separation gap distance 4 in the y-direction between the two arms 12b and 12d is also provided beneath the heater metal layer 16 of the sensor 13.

The above-described underlap distances $\Delta x$ and $\Delta y$ typically have the same dimension, and also the lateral separation gaps 3 and 3 typically have the same dimension, such that a symmetrical geometry exists between the antenna underlapping the detector (sensor) element 13. This results in a square-shaped gap 5 formed in the geometric center of the antenna 12. During use of the focal plane sensor array, incident radiation R, such as mm-wave radiation, is collected by the antenna 12 and is coupled to the dissipative load of the detector element 13 (viz., the heater metal layer element 16 thereof). In the optimum case of this embodiment, the effective series impedance, X, calculated as $X=[(2/\omega C_{overlap})^2+(R_{NiCr})^2]^{1/2}$, is dominated by the heater metal layer 16. This impedance is selected to match the antenna impedance, typically 50–100 ohms. As a result, the temperature of the thin film resistive material 15 (bolometer) increases causing its resistance to change in a way that can be monitored. The purpose and function of providing the nontouching underlaps beneath the heater metal layer 16 of the detector element 13 between the opposite inner ends 6, 6', and 7, 7' of the respective bowtie microantennas 12' and 12" is as follows. Currents are induced into the arms of the antenna structure 12 as it concentrates the energy of the incident radiation R into electrical currents on the conductive arms 12a, 12b, 12c and 12d that are focused to inner ends 6, 6' and 7, 7' of microantennas 12' and 12", respectively. The trapezoid defined by $\Delta x$ forms a capacitance in the x-direction, and the trapezoid defined by $\Delta y$ forms a capacitance in the y-direction. Similarly, the absorbed energy at the antenna 12" is coupled in the overlap region $\Delta y$ into the heater metal film 16. The dimensioning of the nontouching underlaps $\Delta x$ and $\Delta y$ should be selected such that the electrical field on the bowties (12' or 12") can couple (jump) up to the heater metal layer 16, and then the current couples (jumps) back down from the heater metal layer 16 to the bowtie arm located at the opposite side of the gap. The heater metal layer 16 is a material of low resistivity, such as Ni—Cr, and it can be deposited on either or both outer sides of detector element 13. The heat is transferred from the heater metal layer 16 to the thermoresistive layer 15 of the detector element 13 via dielectric film $14_2$, causing the temperature of the thermoresistive material to change in manner that can be monitored and detected by readout circuitry via contacts 18. By appropriately selecting the resistance of the heater metal layer 16 and the capacitance from the antenna underlap $\Delta x$, $\Delta y$, the total impedance of the series capacitance-resistance-capacitance circuit just described is matched to the antenna impedance for efficient coupling. Also, the vertical (z-direction) gap "GAP2" (see FIG. 1) between the heater metal layer 16 of detector element 13 and the antenna 12 determines the overlap capacitance, and this vertical gap is preferably in the range of 0.1 to 1 micrometer. The vertical "Gap 1" (see FIG. 1) determines the effective capacitance of the microbridge detector element 13 to the underlying substrate 21. The thickness of the overglass 20 modifies the capacitance between the antenna 12 and the underlying substrate 21.

Figure 2C:
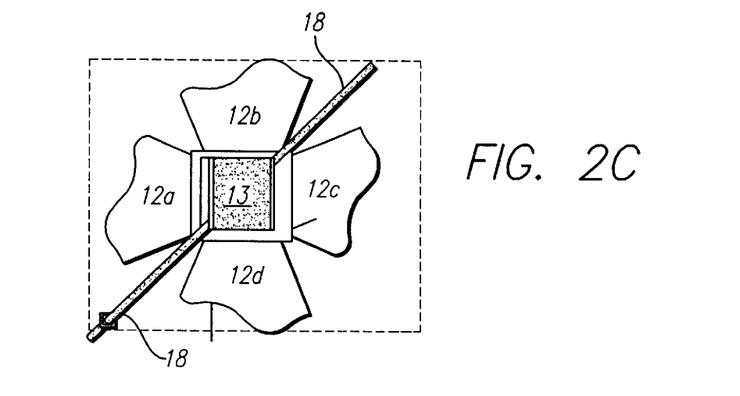
FIG. 2C is another top view of the antenna coupled thermal pixel of FIG. 1 utilizing two orthogonally oriented constituent microantennas and showing the leadout lines.

FIG. 2C illustrates a top view of the radiation sensor 10, i.e., the antenna coupled thermal pixel 10, which shows the contact (leadout) lines 18. FIG. 2B shows a top view of the sensor 10 as indicated by the dotted boundary line showing portions of the crossed bowtie 12, the detector element 13, and the contact lines 18. Only a portion of the crossed bowtie pattern 12 is illustrated in this view. The composite contact legs 18 as shown to extend diagonally to enable contact to the $VO_x$ square 15 in detector element 13 without interfering with the antenna patterns.

In one preferred embodiment, the microbridge detector element 13 is implemented using a composite of at least one NiCr heater layer 16, silicon nitride films $14_1$ and $14_2$, and a thin film bolometric element 15 which is formed of a material having a high thermal coefficient of resistance and other properties appropriate for microbolometer applications that can be deposited as thin film, e.g. $VO_x$. As indicated above, neither of the two crossed bowties 12' and 12" comprising an antenna 12 touch at the geometric center or "knot" of each bowtie due to a lateral separation created between the segments of each bowtie.

The antenna design used in the inventive radiation sensor increases the sensitivity of the sensor 10 in that the antenna 12 thereby intercepts electromagnetic radiation of both polarities. For instance, the crossed bowtie configuration enables the capture of radiation with both polarizations. This approach maximizes performance of the passive millimeter wave detector because natural passive radiation is randomly polarized, i.e., has equal components in both polarization directions. Additionally, since efficient thermal detectors, i.e., bolometers, must have low thermal conductance of the order of 1E-7W/K to their environment, the noncontact feature of this invention eliminates the excess thermal conductance incurred by a direct electrical connection between the antenna and the thermally isolated thermal detector. The inventive sensor array architecture can be operated uncooled as a passive system, and it displaces mm-wave detectors that utilize individual active circuits to detect mm-wave radiation at each pixel.

Figure 5:
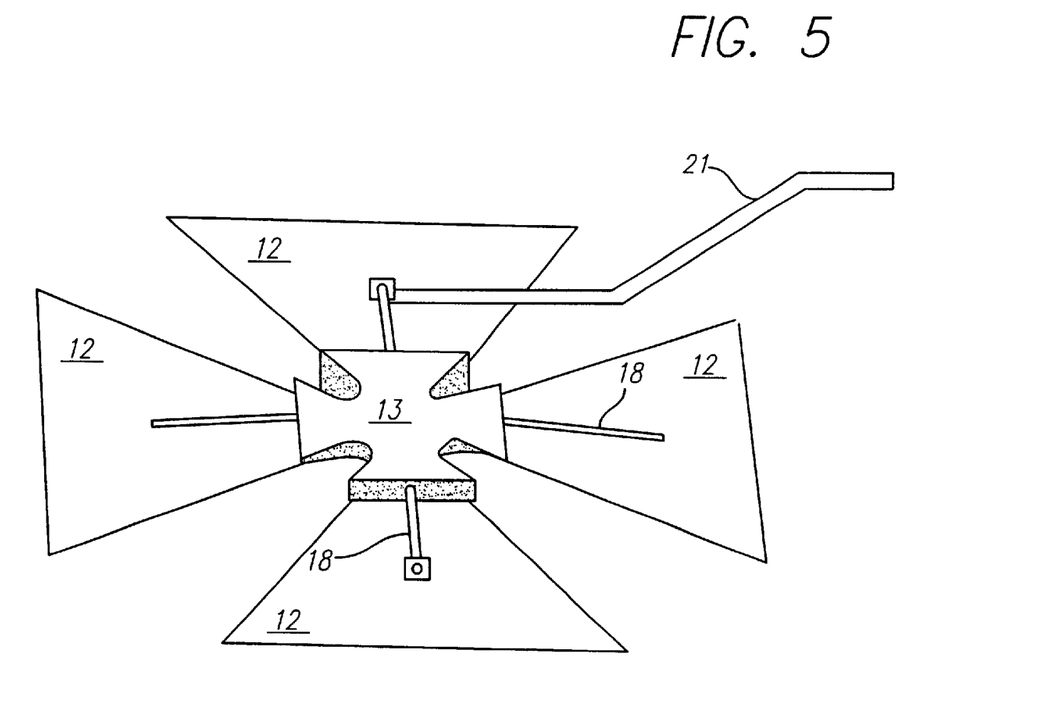
FIG. 5 is a perspective view of a fabricated capacitively coupled mm-wave sensor antenna coupled thermal pixel according to another embodiment of the invention utilizing orthogonally-oriented configurations for both the antenna and the thermal detector.

FIG. 5 is a photo of a variation on the preferred capacitive coupling design described in connection with FIGS. 1 and 2A–C where the thermally sensitive element is instead configured as a crossed bowtie configuration with no central gap, albeit with smaller dimensions, as the underlying antenna 12. The four bridge legs 18 include two for support and two to make electrical connection to the $VO_x$ bolometer. The heater metal layer, which is not visible in this view, is located on the bottom of the bridge detector 13. Holes are used to speed the release process of the bridge 13 from the substrate 21 and its surface films (12, 19 and 20). To minimize the ratio of the bridge 13 to the overlap area, the bridge detector 13 has the crossed bowtie configuration, i.e., two bowties are oriented to intersect substantially perpendicularly (orthogonally) to each other at their geometric middles ("knots").

To fabricate the radiation sensor 10 illustrated in FIGS. 1, 2A–C and 5, standard photolithographic and VSLI processing methods generally can be used to form the overglass layer 20 on the silicon substrate 21, followed by formation of the planar thin film antenna 12 on dielectric pad layer 19. However, the unique orthogonally oriented antenna configuration with a central lateral gap is a development of the present invention. The preferred approach in selection of substrate 21 is for the substrate 21 to be non-absorbing in the spectral detection region and have a thickness of approximately ¼ wavelength (of the midpoint of the band) with a reflective layer 22 provided at the back side 2. Then, to form the thermally isolated detector element 13, a space 23 is initially occupied by a sacrificial layer, such as a resist, polyimide, or other easily selectively etchable or dissolvable material, to provide a temporary support surface upon which the contact lines 18 and the detector element 13 can be formed upon by standard photolithographic and VSLI processing operations. The detector element 13 can be defined in a recess formed in the temporary sacrificial layer occupying recess 23 with the various thicknesses of the support filler and films deposited thereon and delineated controlled to provide Gap 1 and Gap 2 as defined herein. To form the thin film of thermosensitive material 15, vanadium oxide can be deposited in thin film thicknesses, such as less than approximately 2000 angstroms, by various conventional deposition methods such as reactive sputtering, ion beam sputtering, and oxidation of a V film deposited via evaporation. The contacts legs 18 preferably contain a mixture of dielectric nitride (e.g., $Si_3N_4$) with a metal, e.g., Ni—Cr, for stiffening and reducing thermal conductivity of the electrical contact lines 18. In fabricating contact legs 18, the dielectric nitride and Ni—Cr are deposited sequentially as thin films upon the temporary sacrificial layer occupying gap 23, followed by annealing. Once the detector element 13 and contact lines 18 are formed, the temporary support material occupying gap 23 is selectively removed to form an air gap 23 between antenna 12 and detector element 13, which thereby yields the suspended, thermally-isolated detector element 13. A reflective metal layer 22 is formed on the opposite side (face) 2 of the substrate before the thermally isolated detector 13 is released on the front side (face) 1 of the substrate.

Figure 3:
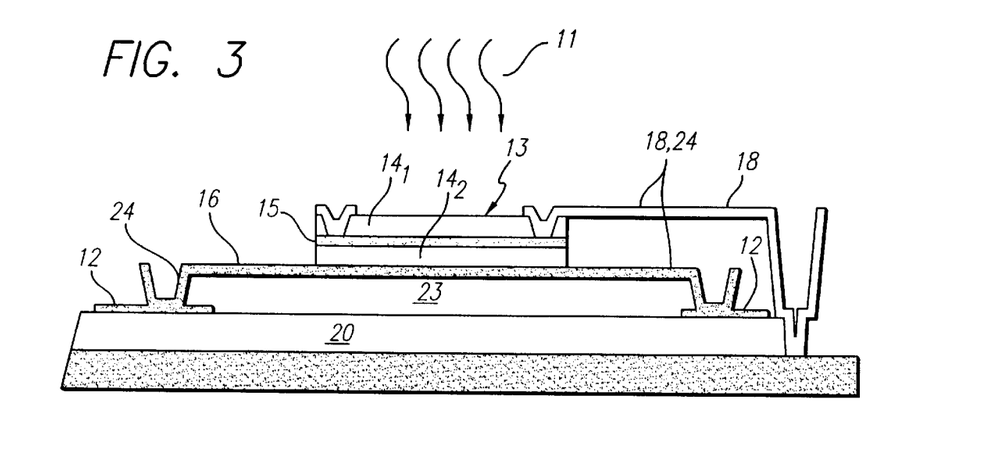
FIG. 3 is a cross-sectional side view of a single thermal pixel of a resistively coupled mm-wave sensor according to another embodiment of this invention.
Figure 4:
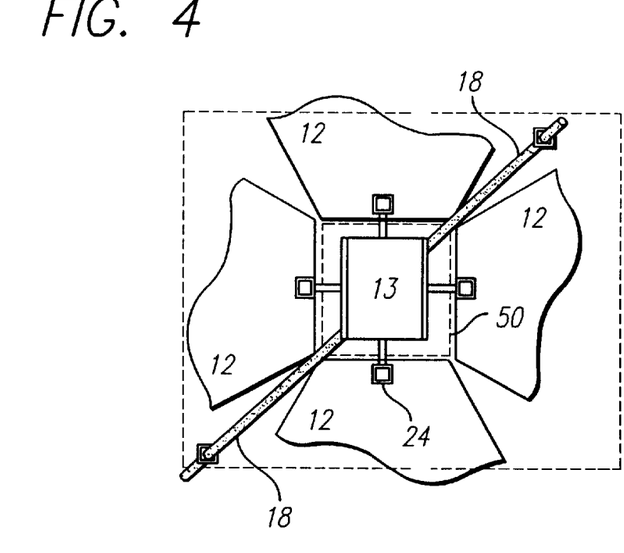
FIG. 4 is a top view of the antenna coupled thermal pixel of FIG. 3 utilizing thin mechanical support posts.

A Resistive Coupling Implementation:

As pointed out before, the resistive coupling is inferior to the capacitive coupling, but in principle it is feasible. FIG. 3 and FIG. 4 show a cross-section and a top view, respectively, for a resistive microbridge implementation of this invention. Similar components are used in this embodiment as those described for the capacitive implementation described above. In the resistive implementation, millimeterwave radiation is collected by the microantennas 12 and coupled to the dissipative load of the microdetectors 13, whose temperature will rise causing the resistance to change. A low-noise circuit (not shown) of conventional design for this purpose can be used to monitor the resistances of the microdetector elements 13 and provide electrical signals to output signal processing circuitry appropriate for the given the application. In cases where latent sensitivity may not be as important, for example, in active system applications, this resistive bridge approach can be utilized. Thin dielectric material posts (not shown) with a film thickness of the order of 100 Å can be utilized to maintain a uniform gap 23 under the bridge detector 13 in the range of approximately 0.2 to 1 Φm. The legs 18 and 24 are not drawn to scale, and the legs are shown in the same plane for clarity.

In the case of resistive coupling, however, the thermal conduction of the electrical contact lines 24 (e.g., Ni—Cr legs) reduces the sensitivity of the bolometers 13 by a factor of 10–20× from the capacitive coupling design. This emerges from the necessity of simultaneously keeping the total bridge impedance, approximately 50–100 ohms, to match the antenna impedance and the thermal conductance of the electrical field lines 24 feeding the microbridge detector 13, $1\times 10^{-7}$ W/K or less. Because thermal and electrical conductance are related (by the Wierman Franz law), it is not possible to select materials which simultaneously meet these conditions. Hence, a sensitivity degradation of approximately 10–20 is incurred in utilizing resistive coupling. This can be determined from the following equation: Relative Sensitivity=50/R* 1E–7/G* 0.5. For a low thermal conductance metal such as NiCr, G is approximately 4E–5/R, and, hence, Relative Sensitivity=0.0625.

Here the first term represents the departure from match to 50 ohm coupling; the second represents the departure from low thermal conductance, and 0.5 represents heating efficiency of the bridge 13 given power dissipation occurring in the legs 24. Thus, assuming linear departures from optimum coupling and thermal conductance, the loss of relative sensitivity is a factor of about 16.

The radiation sensors according to this invention have wide applicability, including, for example, security standoff systems, airport security systems, all-weather landing aids, mine detection, missile homing, urban warfare, and so forth.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A radiation sensor comprising, in combination:
   a substrate having first and second opposing surfaces;
   a thermal detector element located above and physically spaced from the first surface of the substrate to provide a gap therebetween, said detector element comprising:
   a sandwich structure comprising a heater conductive film, a dielectric film, and a thermoresistive film, and contact legs extending downward from and connecting the sandwich structure to the substrate in the spaced manner; and
   a receiver of incident radiation located on the first surface of the substrate and physically spaced from the thermal detector element, for coupling the radiation field to the thermal detector element.

2. The sensor according to claim 1 wherein the receiver of radiation comprises an antenna.

3. The sensor according to claim 2 where the antenna comprises generally a crossed bowtie shape.

4. The sensor according to claim 3 wherein the crossed bowtie shape comprises first and second bowtie microantennas oriented orthogonally to each other, wherein each microantenna comprises first and second conductive arms separated by a lateral gap between inner ends of the arms and where the inner ends underlap the heater conductive layer of the thermal detector element in a manner whereby the antenna couples an incident radiation field to the thermal detector element.

5. The sensor according to claim 3 wherein the heater conductive layer comprises a metal layer.

6. The sensor according to claim 3 where the antenna comprises a generally planar conductive metal film.

7. The sensor according to claim 3 where the antenna comprises a generally planar aluminum film.

8. The sensor according to claim 2 where the thermoresistive film comprises vanadium oxide.

9. The sensor according to claim 2 where the detector element has a surface shape selected from the group consisting of square and diamond.

10. The sensor according to claim 2 where the detector element has a crossed bowtie surface shape.

11. The sensor according to claim 2 where the substrate comprises a semiconductor body and a dielectric overlayer.

12. The sensor according to claim 2 where the substrate comprises a readout integrated circuit.

13. A millimeter-wave radiation sensor comprising, in combination:
    a substrate having first and second opposing surfaces and
    a thermal detector element located above and physically spaced from the first surface of the substrate to provide a gap therebetween, said detector element comprising at least one each of the following: (i) a sandwich structure comprising a heater conductive layer, a dielectric film, and a thermoresistive film, in that sequence, and (ii) contact legs extending downward from and connecting the sandwich structure to the substrate in the spaced manner; and
    an antenna on the substrate and physically spaced from the thermal detector element, for coupling received mm-wave and microwave radiation to the thermal detector element.

14. The sensor according to claim 13 wherein the antenna comprises generally a crossed bowtie shape comprising first and second bowtie microantennas oriented orthogonally to each other, wherein each microantenna comprises first and second conductive arms separated by a lateral gap between inner ends of the arms and where the inner ends underlap the heater conductive layer of the thermal detector element in a manner whereby the antenna couples an incident radiation field to the thermal detector element.

15. The sensor according to claim 13 where the antenna comprises a generally planar aluminum film and the heater conductive layer comprises a metal layer.

16. The sensor according to claim 15 wherein the heater metal layer comprises a nickel-chromium alloy material.

17. The sensor according to claim 13 where the thermoresistive film comprises vanadium oxide.

18. The sensor according to claim 13 where the detector element has a surface shape selected from the group consisting of square and diamond.

19. The sensor according to claim 13 where the detector element has a crossed bowtie surface shape.

20. The sensor according to claim 13 where the substrate comprises a semiconductor body and a dielectric overlayer.

21. The sensor according to claim 13 where the substrate comprises a readout integrated circuit.

22. A method for making a radiation sensor, comprising the steps of:
    providing a substrate having first and second opposing surfaces;
    forming a generally planar thin film antenna on the first surface of the substrate;

depositing a temporary sacrificial layer having an upper horizontally-extending surface and side vertically-extending surfaces on the antenna and the first surface of the substrate;

forming a thermal detector element having a planar sandwich structure and as located above and physically spaced from the antenna due to the intervening sacrificial layer material by sequentially forming, at least one each of the following: a heater conductive layer, a dielectric film, and a thermoresistive film, on a portion of the upper surface of the sacrificial layer forming conductive contact legs in contact with the thermoresistive film and continuing along the side surfaces of the sacrificial layer such that the legs extend downward from and connect the sandwich structure to the substrate; and selectively removing the sacrificial layer to form an air gap between the antenna and the heater metal film of the thermal detector element.

* * * * *

UNITED STATES PATENT AND TRADEMARK OFFICE
CERTIFICATE OF CORRECTION

PATENT NO. : 6,329,655 B1 Page 1 of 1
DATED : December 11, 2001
INVENTOR(S) : Michael D. Jack, Michael Ray, John Varesi, Jan Grinberg, Harold Fetterman, and Franklin A. Dolezal It is certified that error appears in the above-identified patent and that said Letters Patent is hereby corrected as shown below:

<u>Title page,</u>
Item [75], Inventors, the listing of inventor names is revised as follows:

-- Jan Grinberg, Los Angeles; Michael D. Jack, Michael Ray, both of Goleta; John Varesi, Santa Barbara; Harold Fetterman, Pacific Palisades; Franklin A. Dolezal, Reseda, all of CA (US) --

Signed and Sealed this

Eleventh Day of June, 2002

*Attest:*

JAMES E. ROGAN
*Attesting Officer* *Director of the United States Patent and Trademark Office*

UNITED STATES PATENT AND TRADEMARK OFFICE
CERTIFICATE OF CORRECTION

PATENT NO. : 6,329,655 B1
DATED : December 11, 2001
INVENTOR(S) : Jan Grinberg et al.

It is certified that error appears in the above-identified patent and that said Letters Patent is hereby corrected as shown below:

Column 1,
Line 5, insert the following text:
RIGHTS OF THE GOVERNMENT
This invention was made with Government support under contract No. DAAB07-97-2-J035 awarded by the Department of the Army. The Government has certain rights in this invention.

Signed and Sealed this

Tenth Day of August, 2004

JON W. DUDAS
*Acting Director of the United States Patent and Trademark Office*